(12) United States Patent
Sherwani et al.

(10) Patent No.: US 7,650,492 B2
(45) Date of Patent: Jan. 19, 2010

(54) AUTOMATIC UPDATE OF COMPUTER-READABLE COMPONENTS TO SUPPORT A TRUSTED ENVIRONMENT

(75) Inventors: Adil A. Sherwani, Seattle, WA (US); Pranavakumar Punniamoorthy, Redmond, WA (US); Rajesh A Deshpande, Redmond, WA (US); Sumedh N. Barde, Redmond, WA (US); Geoffrey T. Dunbar, Kirkland, WA (US); Reid J. Kuhn, Seattle, WA (US); Clifford P. Van Dyke, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/184,556

(22) Filed: Jul. 19, 2005

(65) Prior Publication Data

US 2007/0033420 A1 Feb. 8, 2007

(51) Int. Cl.
*G06F 9/00* (2006.01)

(52) U.S. Cl. .................. 713/151; 713/160; 713/165; 713/166; 713/167

(58) Field of Classification Search ................. 713/151, 713/160, 165, 166, 167
See application file for complete search history.

(56) References Cited

U.S. PATENT DOCUMENTS

| 5,373,561 A | 12/1994 | Haber et al. |
| 5,615,268 A | 3/1997 | Bisbee et al. |
| 6,128,740 A | 10/2000 | Curry et al. |
| 2004/0111609 A1 | 6/2004 | Kaji et al. |

*Primary Examiner*—Thomas Peeso
(74) *Attorney, Agent, or Firm*—Lee & Hayes, PLLC

(57) ABSTRACT

The present automatic update mechanism provides a method for determining whether computer-readable components loaded within a memory device are at a level of protection specified for protected content that a media application is attempting to process. If a current level of protection provides lower protection that the level specified, a file is updated to achieve at least the level of protection specified by the protected content. Updating the file to achieve the level of protection is performed in a manner that minimizes rebooting of a computing device.

20 Claims, 11 Drawing Sheets

```
INTERFACE IMFCONTENTENABLER : IMFMEDIAEVENTGENERATOR
{
    HRESULT GETENABLETYPE ( [OUT] GUID *PTYPE );

HRESULT GETENABLEURL (
            [IN, OUT, SIZE_IS (*PCCHURL), UNIQUE] WCHAR * PWSZURL,

[IN, OUT] DWORD *PCCHURL,

[IN, OUT, UNIQUE] MF_URL_TRUST_STATUS *PTRUSTSTATUS );

HRESULT GETENABLEDATA (
            [IN, OUT, UNIQUE, SIZE_IS (*PCBDATA)] BYTE *PBDATA,

[IN, OUT] DWORD *PCBDATA );

HRESULT ISAUTOMATICSUPPORTED (
            [OUT] BOOL *PFAUTOMATIC );

HRESULT ENABLE();

HRESULT MONITORENABLE();

HRSEULT CANCEL();

AUTOMATIC UPDATE OF COMPUTER-READABLE COMPONENTS TO SUPPORT A TRUSTED ENVIRONMENT

BACKGROUND

In the past, different types of content were distributed using different types of media. For example, music was distributed on compact discs (CDs) and played using a CD player. Motion pictures were distributed on VHS (Video Home System) tapes or DVDs (Digital Versatile Disks) and played using a VCR (Video Cassette Recorder) or DVD player, respectively. The CD player, VCR, and the DVD player were categorized as consumer-electronic devices which were designed for a specific type of media. These consumer-electronic devices were closed systems in which additional software could not be loaded. Therefore, these closed systems did not allow unauthorized copying of the content.

Today, however, computing devices typically have CD/DVD players (i.e., drives) and other media players integrated within them. Thus, the computing devices can play the same CD or DVD that the consumer-electronic devices can play. In addition, because computing devices are designed as open platforms, additional software can be loaded on the computing devices. This additional software may allow copying of copyrighted content and/or sharing the content with others via the Internet. Therefore, owners of the content are hesitant in allowing computing devices to play their content.

In order to accommodate the content owner's concerns, there has been a number of protection schemes designed to protect content processed on computing devices (hereinafter referred to as digital media) and to promote computing devices as secure players of digital media. One protection scheme was mandated by the Motion Picture Association of America (MPAA). This protection scheme used an encryption algorithm called the Content Scrambling System (CSS) to protect the distribution of DVDs. DVD players were equipped to decrypt the movie content, but could not copy or store the decrypted content. However, a computer hacker developed a computer program that decrypted the CSS. The computer program was then published on the Internet. With this computer program, end-users that had DVD drives in their computing devices could decrypt and store the movie content in a standard file format. The file could then be easily shared with other users on other computing devices, thereby circumventing copyright protection.

Because computing devices are open systems, some individuals continually attempt to "break" the protection schemes that are designed to protect digital media. In order to continually protect the digital media, these protection schemes need to be continually updated. Otherwise, there is a risk that content owners will not allow certain content to be processed on the computing devices. The continual updates and the risk of not having access to certain content impacts end-users, even the end-users that are not performing any of the illegal acts. Therefore, there is need for a mechanism that does not unnecessarily impact innocent end-users when the protection scheme is violated in some manner.

SUMMARY

The present automatic update mechanism provides a method for determining whether computer-readable components loaded within a memory device are at a level of protection specified for protected content that a media application is attempting to process. If a current level of protection provides lower protection that the level specified, a file is updated to achieve at least the level of protection specified by the protected content. Updating the file to achieve the level of protection is performed in a manner that minimizes rebooting of a computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 5 is an exemplary interface that may be used within the present automatic update mechanism to provide a unified set of application programming interfaces for media applications that wish to process protected content;

DETAILED DESCRIPTION

The following description is directed at an automatic update mechanism for updating computer-readable components in support of a content protection scheme. The automatic update mechanism balances the ease-of-use needs of end-users with the content protection needs of the content providers. The automatic update mechanism operates in conjunction with a content protection scheme based on trust. Trust is established by having the components adhere to content policies to ensure that they do not perform any action beyond the actions granted by the content provider and by creating an environment which protects against malicious access to the content owner's protected content. The automatic update mechanism then revokes the trust of a computer-readable component when warranted and attempts to automatically re-establish trustworthiness of the revoked computer-readable component. The manner in which the automatic update mechanism performs its functionality prevents end-users from continuing to exploit vulnerabilities of the protection scheme for an extended period of time, particularly for content released after the exploit is discovered and the vulnerability fixed. This is achieved with minimal impact to end-users who use their digital media in a legitimate manner. Specific implementations of the automatic update concept that operate in various computing environments will now be described.

Figure 1:
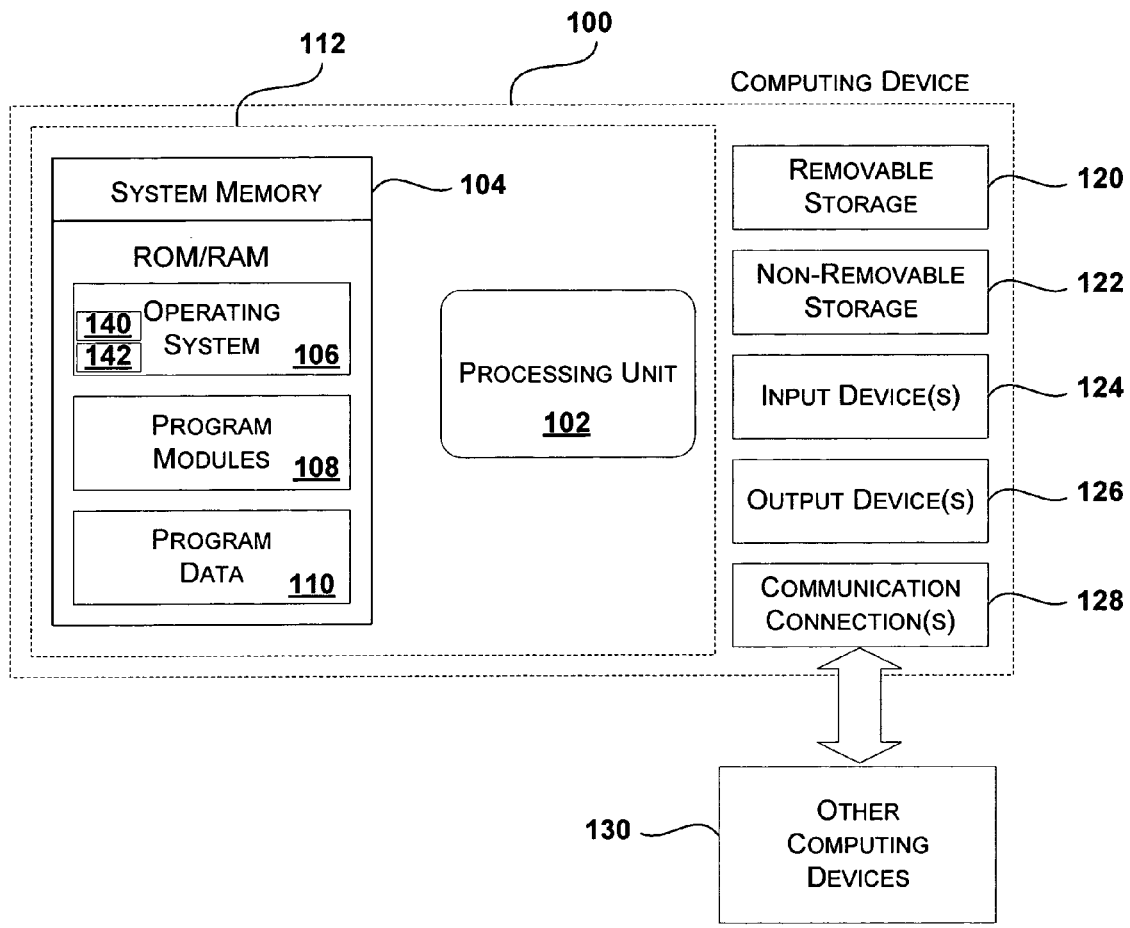
FIG. 1 is an illustrative computing device that may be used to implement the automatic update techniques and mechanisms described herein.

FIG. 1 is an illustrative computing device that may be used to implement the automatic update techniques and mechanisms described herein. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present automatic update mechanism, the operating system 106 includes one or more components 140 for implementing a content protection scheme and one more components 142 for implementing the automatic update mechanism. As will be described below, the automatic update mechanism interacts with the content protection scheme when performing its functionality. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 124 such as keyboard, mouse, pen, voice input device, touch input device, etc. Output device(s) 126 such as a display, speakers, printer, etc. may also be included. These devices are well know in the art and need not be discussed at length here.

Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
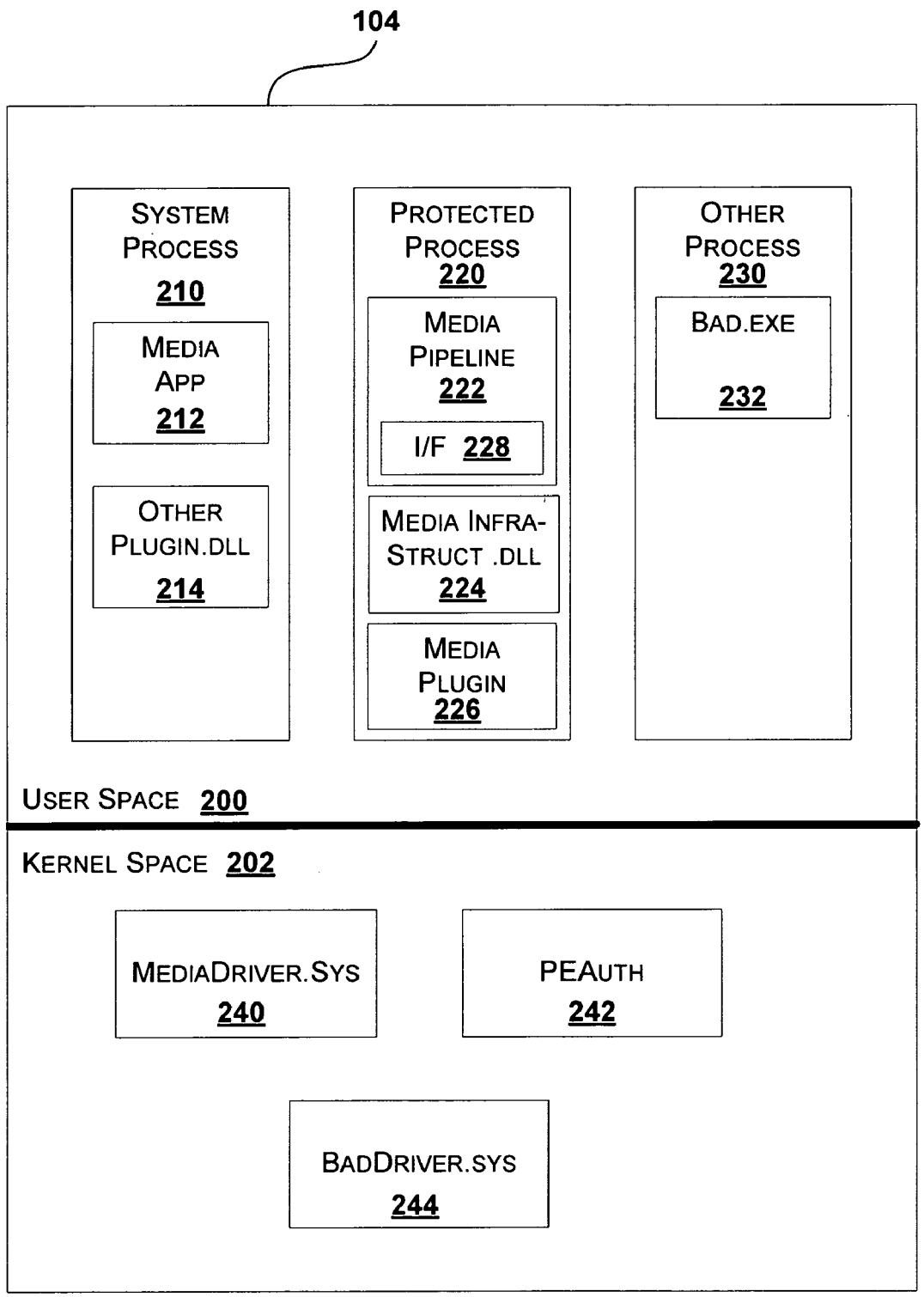
FIG. 2 illustrates an exemplary content protection scheme with which the present automatic update mechanism interacts to protect content processed within the computing device shown in FIG. 1.

FIG. 2 illustrates one embodiment of a content protection scheme with which the present automatic update mechanism may interact to protect content processed within the computing device shown in FIG. 1. In overview, the present automatic update mechanism interacts with any content protection scheme that enforces its security for the content based on the trustworthiness of the computer-readable components that have access to the content. Different embodiments of the content protection scheme may establish the trust for the computer-readable components in different manners. In one embodiment, the trust may be based on a code-signing technique where a "trusted" binary is signed by a "trusted" authority. Once the trust is established, the present automatic update mechanism operates to revoke the trust for computer-readable components that do not warrant the trust. In addition, the automatic update mechanism attempts to re-establish the trust of the revoked computer-readable component. In so doing, the present automatic update mechanism interacts with the content protection scheme. The following discussion describes one embodiment for the content protection scheme and then describes the interactions between this content protection scheme and the automatic update mechanism.

As mentioned above, FIG. 2 illustrates one embodiment for a content protection scheme. The content protection scheme provides a protected environment in which digital media may be processed subject to its associated licensing agreement. The protected environment attempts to thwart attacks that attempt to violate the licensing agreement by limiting the ability of the software components running on the system to access the protected content as it is being processed, by limiting access to memory and execution space, and the like. Thus, licensing agreements that restrict the number of computing devices on which the content may be processed, restrict the number of times the content may be played, restrict the number of times the content may be copied, and the like can be enforced. Because the content protection scheme attempts to provide a protected environment to the digital media, the term protected environment is also used to refer to the protection scheme.

In overview, the protected environment provides a "wall" against outside attacks which are attempting to violate license agreements. The protected environment includes media components in both a user-mode memory space 200 and a kernel-mode memory space 202 of system memory 104 shown in FIG. 1. The media components are configured to process content that needs to be protected (e.g., protected content). Thus, a media application only needs to provide remote control (e.g., Play, Rewind, Pause, Write to CD-ROM) functionality instead of directly handling the protected content. The protected environment also provides support for signed third-party components that can access the protected content.

To achieve this, the protected environment provides a media pipeline 222 that executes within a user-mode protected process 220. The protected process 220 is separate from a system process 210 in which a media application 212 executes. More specifically, software executing in these processes (e.g., system process 210 and other processes 230) can not access the protected process 220. The media application 212 may process content that does not need to be protected. However, if the media application 212 attempts to process protected content, the media application interacts with the media pipeline 222 to process the protected content. If the protected environment becomes aware that a computer-readable component needs to be updated, a content enabler interface 228 is used. Briefly, described in detail below in conjunction with FIG. 5, the content enabler interface encapsulates information needed to perform one of the actions (e.g., updating revocation list, acquiring license, and the like) for processing protected content. The media pipeline 222 performs the processing of the protected content.

In addition, the protected environment includes a kernel-mode component PEAuth 242. In overview, PEAuth 242 is responsible for checking whether each of the components loaded (e.g., bad.exe 232, other plugin.dll 214, and badDriver.sys 244) are trusted components. If one of the components in the kernel-mode 202 is not trusted (e.g, badDriver.sys 244), PEAuth 242 will not allow protected content to be processed.

PEAuth 242 may determine whether computer-readable components are trusted based on their associated signed binaries, certificates on the signed binaries, on a global revocation list (not shown), and the like. If the computer-readable component passes this check, PEAuth allows the computer-readable component to load. If, however, the computer-readable component does not pass this check, PEAuth provides status to the media application. The status is provided via interface 228. The application is then configured to provide a user-interface to the end-user regarding the status. The media application also requests an update via interface 228. PEAuth 242 is notified whenever a protected process is created and whenever a component is loaded into a protected process. When PEAuth is in the process of loading a computer-readable component, PEAuth checks a file associated with the computer-readable component to see whether the file is listed in the global revocation list as revoked.

In addition, the component itself may be checked to see whether it is listed in the global revocation list. If the component is revoked within the global revocation list, a process for renewing that component is performed, as described below in conjunction with FIG. 8. Briefly, described in detail below in conjunction with FIG. 3, the global revocation list identifies items (e.g., components, certificates) that are not trusted. The determination of which items to include within the global revocation list may be performed by a team of individuals. This team is responsible for analyzing information received from protected content owners, the Internet, and/or other sources. Based on this information, the team determines whether the suspected item violates the protected environment and determines how it violates the protected environment. The results of this analysis are then reflected in the global revocation list that will be described below in conjunction with FIG. 3.

Figure 3:
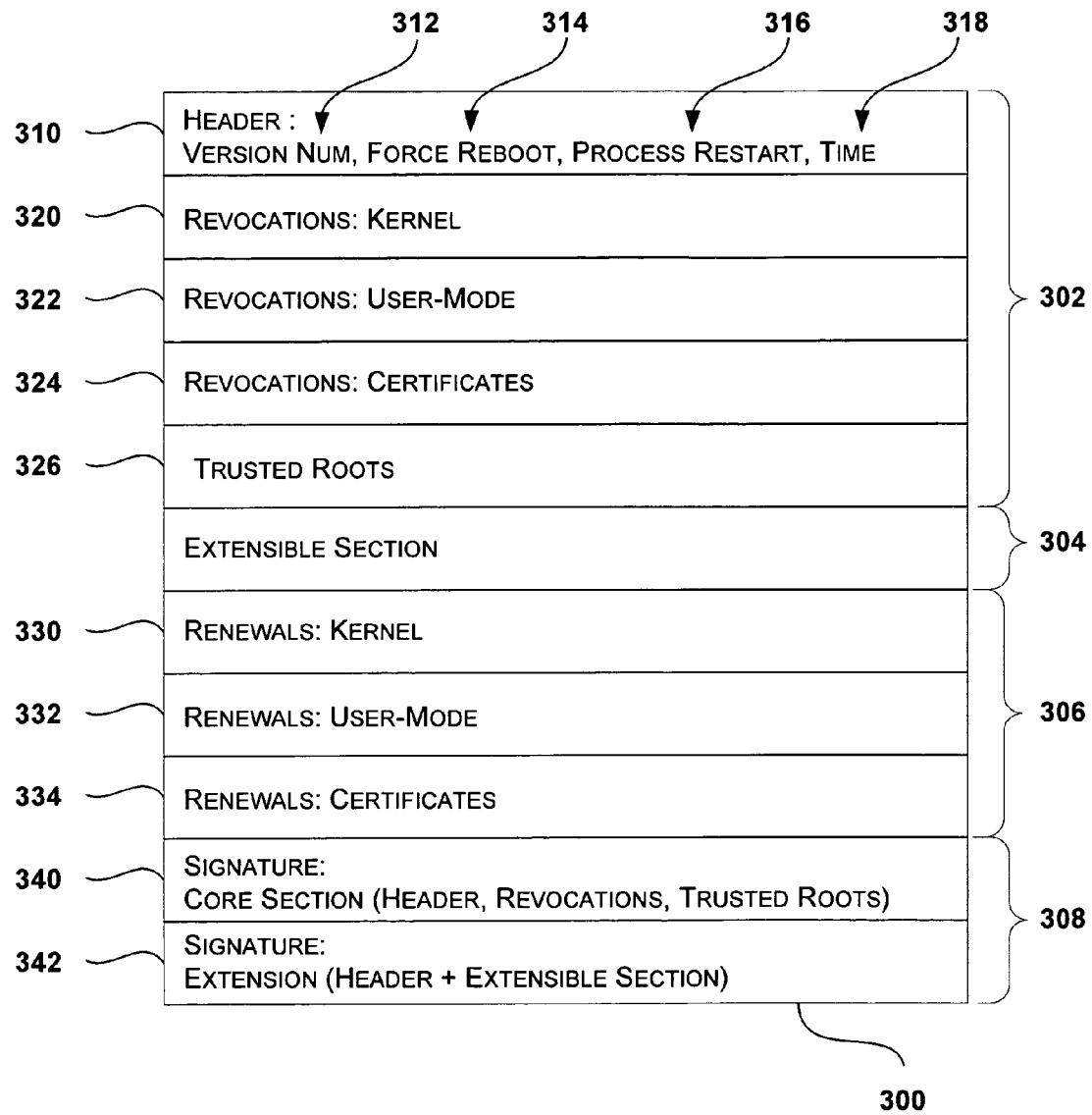
FIG. 3 is a graphical representation of an exemplary format for a global revocation list used by the present automatic update mechanism.

FIG. 3 is a graphical representation of an exemplary format 300 for a global revocation list used by the present automatic update mechanism. In general, the global revocation list allows trust information to be stored in a tamper-proof, easily updatable format. In one embodiment, the format 300 includes several sections: a core section 302, an extensible section 304, a renewal section 306, and a signature section 308. The arrangement of sections 302-308 may be optimized to provide efficient look-up. For example, the core section 302 may be organized so that no breaks occur in the information and may be sorted. This allows a kernel component to load core section 302 directly into memory. Thus, the kernel component does not need to parse the information before being able to use the information. The global revocation list can be digitally signed by a certificate authority in order to ensure its authenticity. Format 300 is one example format for the global revocation list. Other formats may have more or fewer sections with other corresponding sub-sections. In addition, other formats may be arranged differently.

Core section 302 includes several sub-sections: a header 310, a revocation list of kernel components 320, a revocation list of user-mode components 322, a revocation list of certificates 324, and a list of trusted roots 326. Each of these sub-sections will now be described in greater detail.

Header 310 may include a version number 312, a force reboot parameter 314, a process restart parameter 316, and a time parameter 318. The time parameter 318 stores a time at which the global revocation list was created. The version number 312 specifies a number for the version of the global revocation list (GRL). Each time a new global revocation list is published, the version number 312 is modified. The version number 312 is used to ensure that computing systems that process protected content abide by the restrictions set for the protected content. For example, the computing system may be viewing photographs using version #5 of the global revocation list. However, if the same computing system now desires to play a Pay-Per-View movie, the Pay-Per-View movie (i.e., protected content) may specify that the computing device use at least version #8 of the global revocation list. The process for updating the computing device and getting the computing device trusted at version #8 is described below in conjunction with FIGS. 6-10.

Force reboot parameter 314 is used by the automatic update mechanism to minimize the impact of a version update to an end-user on the computing device. This is achieved by indicating with the force reboot parameter 314 whether any of the additions to the revocation lists 320-324 for this version revoke a component that hides itself after being loaded. For example, a component may hide itself by removing itself from a list of "loaded modules" or by inserting code into another module and then unloading itself. Thus, "hiding" refers to the inability of scanning techniques to detect the component as loaded. If the new global revocation list does not revoke any component that attempts to hide itself, the automatic update mechanism may update the revocation list without rebooting the computing device. After updating the revocation list, the automatic update mechanism can be assured that the trust status of the computing device is now at the new version. In this scenario, if one of the components listed in one of the revocation lists 320-324 is not detected (i.e., not hidden), the automatic update mechanism may be assured that the component was not loaded.

However, if the new global revocation list does revoke a component that attempts to hide itself once loaded, the automatic update mechanism can not be sure that the hidden component is not still loaded, even after the renewal. Therefore, a reboot is necessary to detect the hidden component. If the component that hides itself is a user-mode component, the component will be blocked from loading after the reboot. However, if the component is a kernel-mode component, the component will be loaded but the protected environment will not allow protected content to be processed.

Because many of the revocations listed in the revocation lists 320-324 revoke components that accidentally causes a violation by not implementing a feature correctly, the force reboot parameter 314 minimizes the number of times that the computing device needs to be rebooted. This greatly minimizes the negative impact to end-users on the computing device.

In one embodiment, the force reboot parameter 314 is implemented as a counter. The counter is updated whenever a global revocation list revokes a component that attempts to hide itself. Using a counter as the force reboot parameter is helpful in the situation where a computing device has skipped several versions of the global revocation list. For example, a computing device may be currently using version #3 of the global revocation list. However, when it attempts to process a specific protected content, the trust agreement associated with the protected content may specify that the computing device can only process the protected content if it is using version # 10 of the global revocation list. If the force reboot parameter 314 was implemented using a yes/no indicator, the computing device may fail to establish trust at the version #10 level. This may occur if one or more of the versions (versions #4-#9) specified "yes" for the force reboot parameter 314, but version #10 specified "no". Without knowing about the force reboot parameter 314 in the other global revocation lists, the automatic update mechanism would be unaware that a reboot is needed. Without rebooting, the protected environment would still have the revoked component loaded. By using a counter, the value of the counter in the new global revocation list may be easily compared with the value of the counter in the prior global revocation list. The automatic update mechanism can then force a reboot if the counters differ.

The restart parameter 316 may be used by the automatic component update mechanism to further minimize the impact of a version update to an end-user on the computing device. The components identified in the revocation lists 320-324 may be categorized into three class: 1) Non-malicious components; 2) Malicious user-mode components; and 3) Malicious kernel-mode components. The first class, non-malicious components, typically occur accidentally by failing to securely implement a feature within the component. Therefore, these types of components do not typically attempt to hide themselves. The second class and third class are specifically written to violate the trust agreement associated with some type of protected content. Because these types of components are malicious, they typically attempt to hide themselves after being loaded.

The restart parameter 316 may be used in conjunction with the force reboot parameter 314 to identify whether a reboot is necessary, whether a re-start of the protected processes is necessary, or whether a renewal of the component is necessary in order to establish the trust at the level of the new global revocation list. For components within the first class, the automatic update mechanism can meet the requirements of the new global revocation list by renewing any of the revoked components that are currently loaded. For components within the second class, the automatic update mechanism can meet the requirement of the new global revocation list by restarting each protected process. Because the revoked malicious user-mode component is within the protected process, once the protected process is killed, the malicious user-mode component is also effectively killed. When the protected process is restarted, the malicious user-mode component listed in the updated global revocation list will be prevented from loading. For components within the third class, the automatic update mechanism can meet the requirement of the new global revocation list by rebooting the computing device as explained above for the force reboot parameter 314.

In one embodiment, the restart parameter 316 may be implemented as a counter and used in conjunction with the force reboot parameter 316. For example, if the force reboot parameter indicates that it is not necessary to reboot the computing device, the restart parameter 316 may be compared with the old restart parameter to determine whether it is necessary to restart the protected processes. This allows the end-users to continue to run other applications (e.g., word processor, games) that do not need protected processes, while the protected processes are re-started. This effectively minimizes the impact to the end-users while still maintaining a level of trust for the protected content running on the computing device.

The revocation list for kernel-mode components 320, the user-mode components 322, and the certificates 324 are similar. The revocation lists include an entry that identifies an item that is to be revoked. The item may be a file, an individual computer-readable component, or a certificate. The file may be a dynamic link library (DLL) or executable (.EXE) file in which several computer-readable components are stored. The item is identified using a unique identifier, such as a hash of a user-mode or kernel-mode binary to revoke, or a hash of a public key of a certificate to revoke. Interestingly, items that are specified as revoked in the global revocation list may still be used outside the protected environment. The identification of a component within the global revocation list only affects its status as a trusted component in the protected environment.

If the item identifies a certificate, any computer-readable component certified by that certificate authority is revoked. In addition, any computer-readable component that was certified with a certificate in the chain of trust up to the identified certificate is also revoked. The chain of trust continues until stopping at a root authority. This prevents a hacker from using a certificate authority that has been compromised to sign malicious computer-readable components.

Trusted roots section 326 identifies root authorities from which a chain of trust may be initiated. Therefore, if a computer-readable component is certified by a root authority that is not listed as one of the trusted roots, the PEAuth will not load the component. This prevents a hacker from creating a root authority for signing malicious computer-readable components.

Entries for items that have been revoked in sections 320-322, usually have a renewal entry in the corresponding renewal section 330-332. The renewal entry includes a renewal globally unique identifier (GUID). In one embodiment, the renewal GUID may specify a category identifier. The renewal entries in each subsection may be sorted by the hash value. An exemplary process for renewing components is described below in conjunction with FIG. 8.

Extensible section 304 may contain extensible revocation information that is used in establishing trust with downstream components. An extension GUID identifies each extensible entry. The extensible section 304 may be sorted by the extension GUID.

Signature 340 stores a signature for the header 310 and the core data sections 320-326. Signature 342 stores a signature for the header 310 and the extensible section 304. Signatures 340 and 342 are used to verify that no one tampered with the corresponding sections within the global revocation list. The signature is signed by a trusted entity. The global revocation list signing certificate roots up to a pre-defined trusted root that is available during verification. The pre-defined trusted root may be hard-coded within the verification logic. The renewal entries do not need to be signed. If someone tampers with the renewal section 306, the computing device will fail to obtain the renewals. However, this failure will not cause any security problems to the protected environment or to the computing device. If this occurs, a new global revocation list will be obtained as described below in conjunction with FIG. 7.

The following is exemplary syntax for the global revocation list (GRL_HEADER), each entry in the global revocation list (GRL_ENTRY), each entry in the extensible section (GRL_EXTENSIBLE_ENTRY), each entry in the renewal section (GRL_RENEWAL_ENTRY), and the signatures (BIN_SIGN):

```
typedef struct _GRL_HEADER {
    WCHAR       wszIdentifier[6];
    WORD        wFormatMajor;
    WORD        wFormatMinor;
    FILETIME    CreationTime;
    DWORD       dwSequenceNumber;
    DWORD       dwForceRebootVersion;
    DWORD       dwForceProcessRestartVersion;
    DWORD       cbRevocationsSectionOffset;
    DWORD       cRevokedKernelBinaries;
    DWORD       cRevokedUserBinaries;
    DWORD       cRevokedCertificates;
    DWORD       cTrustedRoots;
    DWORD       cbExtensibleSectionOffset;
    DWORD       cRevokedKernelBinaryRenewals;
    DWORD       cRevokedUserBinaryRenewals;
    DWORD       cRevokedCertificateRenewals;
    DWORD       cbSignatureCoreOffset;
    DWORD       cbSignatureExtOffset;
} GRL_HEADER;
typedef struct _GRL_ENTRY {
    BYTE        rgbGRLEntry[GRL_HASH_SIZE];
} GRL_ENTRY;
typedef struct _GRL_EXTENSIBLE_ENTRY {
    GUID        guidExtensionID;
    BYTE        rgbExtensibleEntry[GRL_EXT_ENTRY_SIZE];
} GRL_EXTENSIBLE_ENTRY;
typedef struct _GRL_RENEWAL_ENTRY {
    GRL_ENTRY   GRLEntry;
    GUID        guidRenewalID;
} GRL_RENEWAL_ENTRY;
typedef struct _BIN_SIGN {
    DWORD       dwSignFormat;
    DWORD       dwSignSize;
    BYTE        rgbSignature[1];
} BIN_SIGN;
```

One will appreciate that the exemplary format described for the global revocation list may change over time. When this occurs, existing components will recognize that there is a new format and fail gracefully. An updated format reader will then be obtained by the protected environment that will be configured to read the new global revocation list format.

Figure 4:
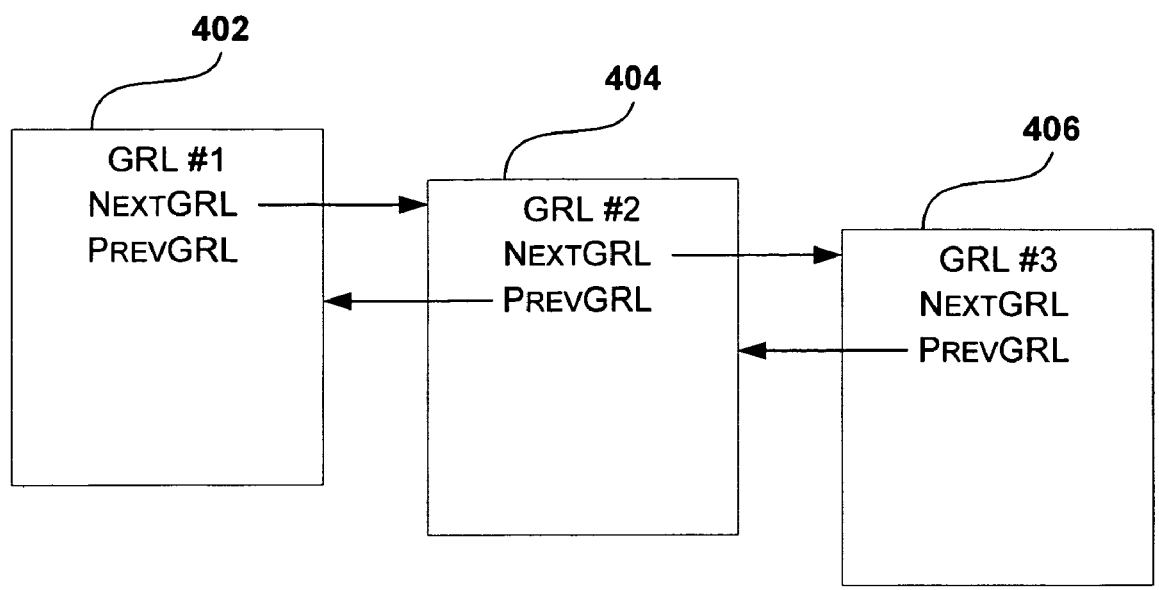
FIG. 4 is a graphical representation of another embodiment of the global revocation list.

FIG. 4 is a graphical representation of another embodiment of the global revocation list. As described above, in order to maintain the security level for all computing devices, once a computer-readable component or certificate is listed in the global revocation list, the component or certificate typically remains in the global revocation list. Thus, the single file may become too large and unwieldy. Therefore, it is envisioned that the one file may be separated into multiple files.

FIG. 4 is a graphical depiction of one embodiment for a multiple file global revocation list. Each file 402, 404, and 406 maintains the exemplary format described above in FIG. 3. In addition, each file 402, 404, 406 contains a pointer to the next file (i.e., NextGRL) and a pointer to the previous file (i.e., PrevGRL) in a linked list implementation. Additional multi-part files may be added when the last file 406 reaches a certain size. In this embodiment, once the computing device has downloaded multi-part files 402, 404, and 406, it is only necessary to download the last file (i.e., multi-part file 406) when there is a new version of the global revocation list. Depending on the number of revocations and renewals, this may substantially increase the performance for downloading the global revocation list. However, having multi-file global revocation lists may cause the renewal process to be less efficient, in particular the process of loading the global revocation list.

The present automatic update process may be performed in two different scenarios. The first scenario is an on-demand process while a media application is attempting to process protected content. The second scenario is a periodic update process that is scheduled at pre-determined intervals. Before describing the on-demand and periodic automatic update processes, one exemplary interface used within the present automatic update mechanism is described. FIG. 5 is an exemplary interface 500 that may be used within the present automatic update mechanism to provide a unified set of application programming interfaces for media applications that wish to process protected content. The unified set of APIs helps in the development of the media applications. For example, the unified set of APIs allow the user-interface of the media applications to stay uniform for different scenarios, such as updating the global revocation list, renewing a component, popping up a help web page, and the like. Each of the APIs will now be described.

A GetEnableType method 502 is called by the media application and returns a type specific to the scenario for which the content enabler 500 was created. Content enablers are created by the media pipeline 222 shown in FIG. 2 after PeAuth 242 checks to see whether the protected environment can be trusted. If the environment can not be trusted, the content enabler 500 is created and the type is set by the media pipeline 222 that indicates what is needed in order to allow access to the protected content. The media application may then display strings in the user-interface based on the type returned.

A GetEnableURL method 504 is called by the media application to obtain a uniform resource locator (URL). The media application can then launch a web browser to navigate to the specified uniform resource locator. The media application can perform an HTTP POST request to the uniform resource locator. GetEnableURL method 504 includes three parameters: pwszURL 510, pcchURL 522, pTrustStatus 524. Parameter pwszURL 510 is a pointer to an array allocated by the caller. Parameter pcchURL 522 specifies a length for the array. The caller initializes parameter pcchURL 522 to the size of the array pointed to by parameter pwszURL 510. Parameter pTrustStatus 524 informs the media application whether the URL is from a trusted source. The media application calls GetEnableURL method 504 twice. The first time to get the length of the array to allocate and the second time with the allocated array and the size. GetEnableURL method 505 can be used when the content enabler can not automatically perform the actions needed based on the type specified.

A GetEnableData method 506 is called by the media application to return the data that accompanies the HTTP POST request performed in the GetEnableURL method 504. GetEnableData method 506 includes two parameters: a parameter pbData 530 and a parameter pcbData 532. Parameter pbData 530 points to an array allocated by the caller. The content enabler object populates the array with the POST data if the size of the array, indicated by parameter pcbData 532, is sufficient. The media application calls GetEnableData method 506 two times. The first time with the parameter pbData set to NULL in order to get the size of the array to allocate. The second time with the allocated array and its size. This allows the media application to obtain additional data, such as a publisher of the revoked component, a version for the revoked component, and the like.

An IsAutomaticSupported method 508 is called by the media application to determine whether the content enabler object can perform the actions needed for the type specified automatically. The content enabler sets parameter pfAutomatic 540 to TRUE if the content enabler can perform the required operations on its own. Alternatively, the content enabler sets parameter pfAutomatic 540 to FALSE if it needs the media application to do any portion of the required operation. For example, if the content enabler is initialized to get updates through an update service, setting pfAutomatic 540 to TRUE indicates that the content enabler should handle the interactions with the update service internally so that the end-user does not have to be unnecessarily inconvenienced during the interactions. If the content enabler is initialized to get updates via a webpage, setting pfAutomatic 540 to FALSE indicates that the content enabler will expose the webpage URL to the application so that the media application can open a browser window and navigate to the specified URL.

An Enable method 510 is called by the media application to automatically perform the operations specific to the type of content enabler object. The Enable method 508 is called by the media application once the end-user authorizes the media application to perform the operations presented in the user-interface.

A MonitorEnable method 512 is called by the media application if the media application wants to be notified when the operation completes and/or wants to receive ongoing status. The content enabler queues up a MEEnablerCompleted event onto its IMFMediaEventGenerator interface.

A Cancel method 514 is called by the media application to cancel a pending operation.

By abstracting the operations through these interfaces, a media application can write common code to deal with various steps for obtaining a trusted environment. In addition, future content may be automatically plugged in under the media application as long as the requirements for the future content can be abstracted within this interface. One exemplary calling sequence for a content enabler is now described using APIs available from the MICROSOFT® WINDOWS® Update software. An installation session is created by calling IUpdateSession. An update searcher object is created by calling IUpdateSession::CreateUpdateSearcher. The update searcher object is then used to search for the update identified by the GUID by calling IUpdateSearcher::Search. A download object is then created by calling IUpdateSession::CreateUpdateDownloader. Specific updates can be downloaded by passing search results to IUpdateDownloader. The updates can be downloaded to the computing device by calling IUpdateDownloader::Download. An install object is created by calling IUpdateSession::CreateUpdateInstaller. The collection of downloaded updates to install can be passed when calling IUpdateInstaller::Install. The Install method then installs the updates on the computing device.

Figure 6:
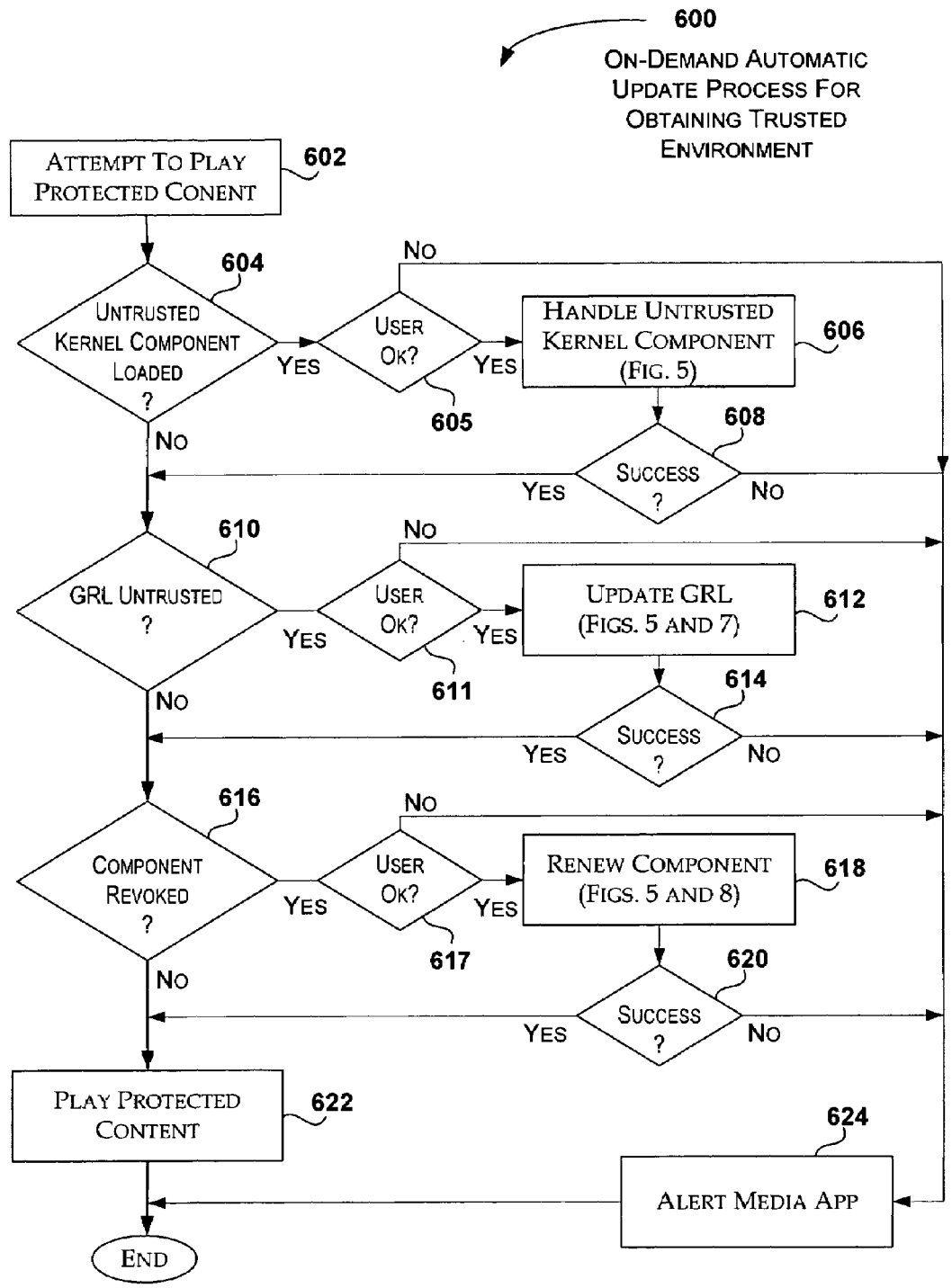
FIG. 6 is a flow diagram illustrating an exemplary on-demand automatic update process for obtaining a trusted environment.

FIG. 6 is a flow diagram illustrating an exemplary on-demand automatic update process for obtaining a trusted environment. In overview, the protected environment ensures that the environment is trusted before allowing protected content to be processed. On-demand process 600 begins at block 602, where a media application is attempting to process protected content. Processing continues at decision block 604.

At decision block 604, a determination is made whether there is an untrusted kernel component loaded. The may occur if an unsigned kernel-mode component is installed on the computing device. Because the untrusted kernel component could potentially access anything on the computing device, including the protected content, the untrusted kernel component is handled before the protected content is processed. If there is an untrusted kernel component loaded, processing continues at decision block 605. Otherwise, processing continues at decision block 610.

At decision block 605, a user interface is presented to the end-user by the media application. If the end-user does not authorize process 600 to handle the untrusted component, processing continues at block 624. Otherwise, processing continues at block 606.

At block 606, the untrusted kernel component is handled. The untrusted kernel component may be uninstalled or updated with a signed version. Uninstall instructions may be obtained via a help page on a web site. An updated signed version may be obtained using an update service, a download center, a third party site belonging to the publisher of the component. If the untrusted kernel component has been revoked, the global revocation list entry that revokes the untrusted kernel will identify a package identifier. This package identifier is then requested from the update service. However, if the global revocation list does not identify a package identifier for the untrusted kernel component or the untrusted kernel component is not identified in the global revocation list, a link mechanism may be used to determine how to handle the untrusted kernel component. One embodiment for a link mechanism is described below in conjunction with FIG. 10. The link mechanism may then specify a package identifier, a webpage where a new version can be downloaded, a webpage that describes uninstall instructions, and the like. The process for handling the untrusted kernel component uses the uniform set of APIs described above in FIG. 5.

After this occurs, the process continues to decision block 608, where a check is made to determine whether the untrusted kernel component was successfully handled. If the untrusted kernel component was handled successfully, processing continues at decision block 610. Otherwise, processing continues at block 624.

At decision block 610, a determination is made whether the current global revocation list is untrusted. This may occur if the global revocation list is older than the version specified for the protected content, if tampering occurred to the global revocation list, and the like. If the global revocation list is not trusted, processing continues at block 611. Otherwise, processing continues at decision block 616.

At decision block 611, a user interface is presented to the end-user by the media application. If the end-user does not authorize process 600 to update the global revocation list, processing continues at block 624. Otherwise, processing continues at block 612.

At block 612, the global revocation list is updated. Briefly, described in detail in conjunction with FIGS. 5 and 7, the current global revocation list is replaced with the specified version or a version higher than the specified version, if available. After attempting to update the global revocation list, a check is made (decision block 614) to determine whether the updating of the global revocation list was successful. If it was successful, processing continues at decision block 616. Otherwise processing continues at block 624.

At decision block 616, a determination is made whether a component is revoked. Briefly, described in detail below in conjunction with FIGS. 5 and 8, once the end-user authorizes the media application to get the new (i.e., updated) components, the media application via the uniform APIs can automatically renew the components without further intervention by the end-user. The updated components are also hereinafter referred to as renewal components. In the past, the end-user was sent a notification that components needed updating and to try again later. This would occur for each component that needed to be updated. In contrast, in accordance with the present automatic update mechansim, once the end-user authorizes the media application to process the content, each of the needed components are automatically updated without any further user intervention. If there is a component that is revoked, processing continues at block 618. Otherwise, processing continues at block 622. While not shown, process 600 may have a loop or other logic to update each needed component that has been identified as revoked in the global revocation list.

At block 618, the component or components that are identified as revoked are renewed. Briefly, described in detail below in conjunction with FIGS. 5 and 8, the renewal of the component(s) occurs with minimal interaction with the end-user. The end-user will experience a brief delay before the protected content begins processing seamlessly as long as the renewals were successful. After attempting to renew the component(s), a check is made (decision block 620) to determine whether the revoked component(s) were successfully renewed. If they were successfully renewed, processing continues at block 622 to allow the media application to process the protected content. Otherwise, processing continues at block 624.

At block 624, an alert is sent to the media application to let the media application know why the protected content could not be processed. Processing then proceeds to the end.

Figure 7:
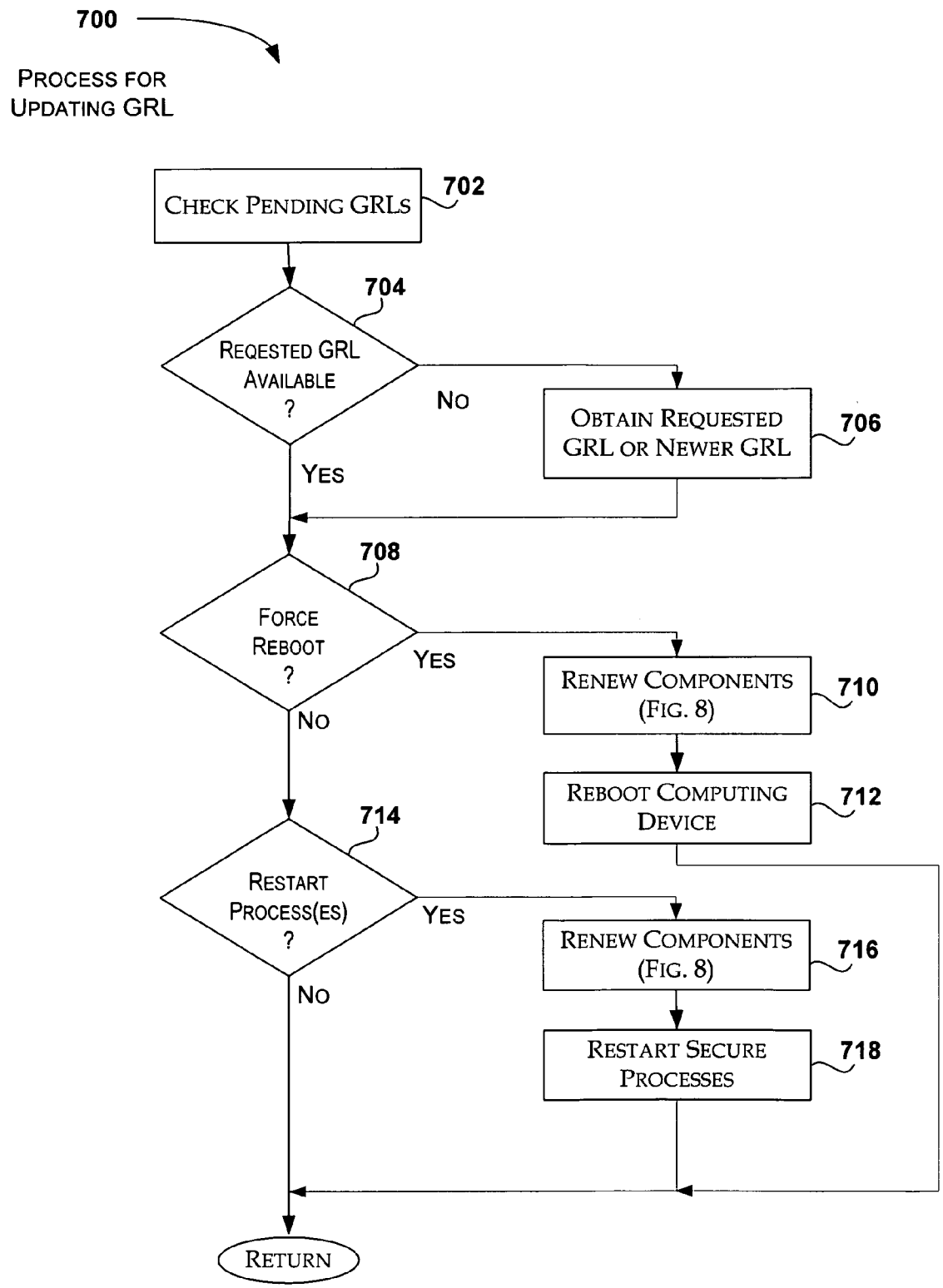
FIG. 7 is a flow diagram illustrating an exemplary process for updating a new global revocation list that is suitable for use in the on-demand process shown in FIG. 6.

FIG. 7 is a flow diagram illustrating an exemplary process 700 for updating a new global revocation list on the computing device shown in FIG. 1. Process 700 begin at block 702, where the protected environment checks whether the requested version or a higher version of the global revocation list has been previously downloaded. As will be described below in conjunction with FIG. 9, a periodic automatic update process may be configured to periodically download new global revocation lists. The newly downloaded global revocation list(s) may be saved on the computing device as one of the pending global revocation list(s). These pending global revocation list(s) are checked to see whether the new version of the global revocation list has already been downloaded. Processing then proceeds to decision block 704.

At decision block 704, a determination is made whether the requested global revocation list or a higher version of the global revocation list is already available on the computing device. In addition, to the pending global revocation list(s), a check is made whether a global revocation list is packaged with the protected content. If the desired global revocation list is not available, processing continues at block 706. Otherwise, processing continues at decision block 708.

At block 706, the requested global revocation list or a higher global revocation list is obtained. A content enabler object is created and initialized with an identifier for a global revocation list. An option within the protected environment specifies whether the global revocation list is updated to the requested version or updated to the highest version of the global revocation list. Updating using the requested version is beneficial because the protected content will almost certainly be allowed to be processed after the upgrade occurs. Updating using a higher version of the global revocation list may cause the protected content not to work, but provides the greatest security to content owners. It also minimizes the number of times that the global revocation list needs to be updated. The media application can call one or more of the unified APIs described above in conjunction with FIG. 5. For example, if "AUTOMATIC" is enabled, calling enable method 510 automatically installs the global revocation list identified by the identifier within the global revocation list. If the identifier specifies a package identifier, the identifier is sent to an update service to obtain the global revocation list. If the identifier specifies a unique URL, the URL may navigate to a download center, a help web page, or the like. In one embodiment, the automatic install may be achieved via MICROSOFT® WINDOWS® Update software. For this embodiment, when a new global revocation list is published, the global revocation list is uploaded to the update service within a specified category, such as media renewals. The specified category may sort the different versions of the global revocation list based on the identifier. Thus, when the option is selected to obtain the highest version of the global revocation list, the update service downloads the last global revocation list that was uploaded. In one embodiment, the global revocation list package uploaded to the update service will contain the latest global revocation list. In another embodiment, a global revocation list setup package can be hosted at a download center. The download center accepts command line parameters and uses the command line parameters to install a corresponding version of the global revocation list. Even though the global revocation list setup package may contain multiple global revocation lists, one global revocation list is selected for installation based on the command line option(s). Processing continues at decision block 708.

At decision block 708, the force reboot parameter is reviewed to determine whether a reboot is needed. In one embodiment, the force reboot of the new global revocation list is reviewed with the force reboot parameter in the current global revocation list. If the comparison differs, processing continues at block 710. Otherwise, processing continues at decision block 714.

At block 710, the components that are needed by the media application and that have been revoked are renewed. The renewal process is described below in conjunction with FIG. 8. After the components are renewed, processing continues at block 712.

At block 712, the new global revocation list is saved as the current global revocation list and the computing device undergoes a reboot. After the reboot, the PEAuth uses the new global revocation list when loading components. Processing is complete.

At decision block 714, a determination is made whether the new global revocation list specifies re-starting the protected process. This determination may be based on the process restart parameter in the new global revocation list and the current global revocation list. If the process restart parameters differ, processing continues at block 716. Otherwise, processing is complete.

At block 716, the components that are needed by the media application and that have been revoked are renewed. The renewal process is described below in conjunction with FIG. 8. After the components are renewed, processing continues at block 718.

At block 718, the protected processes are re-started. As explained above, re-starting the protected processes kills the malicious user-mode component within the protected process. Then when the protected process is restarted, the user-mode component listed in the new global revocation list is prevented from loading. The process 700 for updating the global revocation list is then complete.

Figure 8:
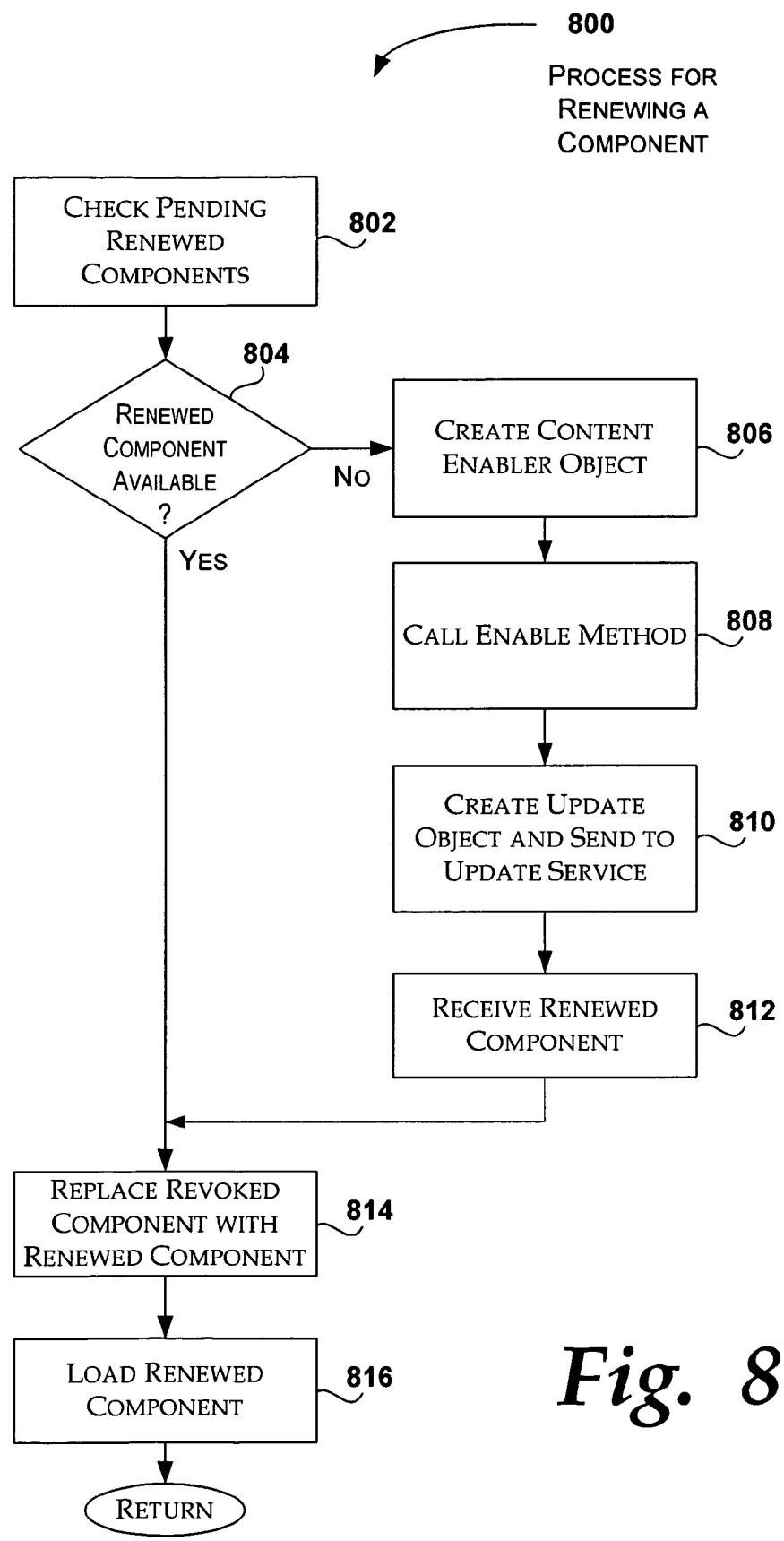
FIG. 8 is a flow diagram illustrating an exemplary process for renewing a computer-readable component that is suitable for use in the on-demand process shown in FIG. 6.

FIG. 8 is a flow diagram illustrating an exemplary process 800 for renewing computer-readable component(s) that is suitable for use in the on-demand automatic update process shown in FIG. 6. Process 800 is performed for each of the components needed by the media application that were identified as being revoked in the global revocation list. However, the end-user may be presented only once with a user-interface asking whether the user wishes to perform an automatic update. Process 800 begins at block 802, where pending renewed components are checked to determine whether the needed renewed components have already been downloaded and installed. Briefly, described below in conjunction with FIG. 9, the pending renewed components may have been previously downloaded by a periodic automatic update process. Processing continues at decision block 804.

A decision block 804, a determination is made whether the revoked component is already available. If the revoked component has been previously downloaded, processing continues at block 814. Otherwise, processing continues at block 806.

At block 806, a content enabler object is created for the revoked component. The content enabler object is created by the media pipeline component 222. The content enabler object is initialized with an identifier for the revoked component. The identifier may be a hash associated with the revoked component or a certificate of the revoked component. For a revoked certificate, the content enabler is initialized with the hash of the certificate's public key and a filename of the component that is being revoked. The link mechanism may then redirect based on both the hash and/or the certificate. The link mechanism may have a separate entry for each component signed by the revoked certificate. Processing continues at block 808.

At block 808, the enable method of the content enabler object is called. This call is performed by the media application 212 after the media pipeline component 222 passes the content enabler object to the media application. The media application can also use other uniform APIs, discussed above in conjunction with FIG. 5, to obtain additional information if desired. The identifier in the content enabler object identifies a renewal package available on the update service. Processing continues at block 810.

At block 810, an update object is created and sent to the update service. The enable method of the content enabler object is responsible for creating the update object. The update object includes the identifier for the revoked component. When the update service receives the update object, it searches its packages for the package having the specified identifier. One exemplary calling sequence is described above in conjunction with FIG. 5. Processing continues at block 812.

At block 812, the media application receives the renewed component via the enable method. Processing continues at block 814.

At block 814, the revoked component stored on the computing device is replaced with the renewed component. This may entail overwriting the revoked component with the renewed component. Processing continues at block 816.

At block 816, the renewed component is loaded so that the media application may use the component for its processing. Process 800 for renewing a component is then complete. As mentioned above, process 800 is performed for each component that is needed by the media application and that has been revoked.

Figure 9:
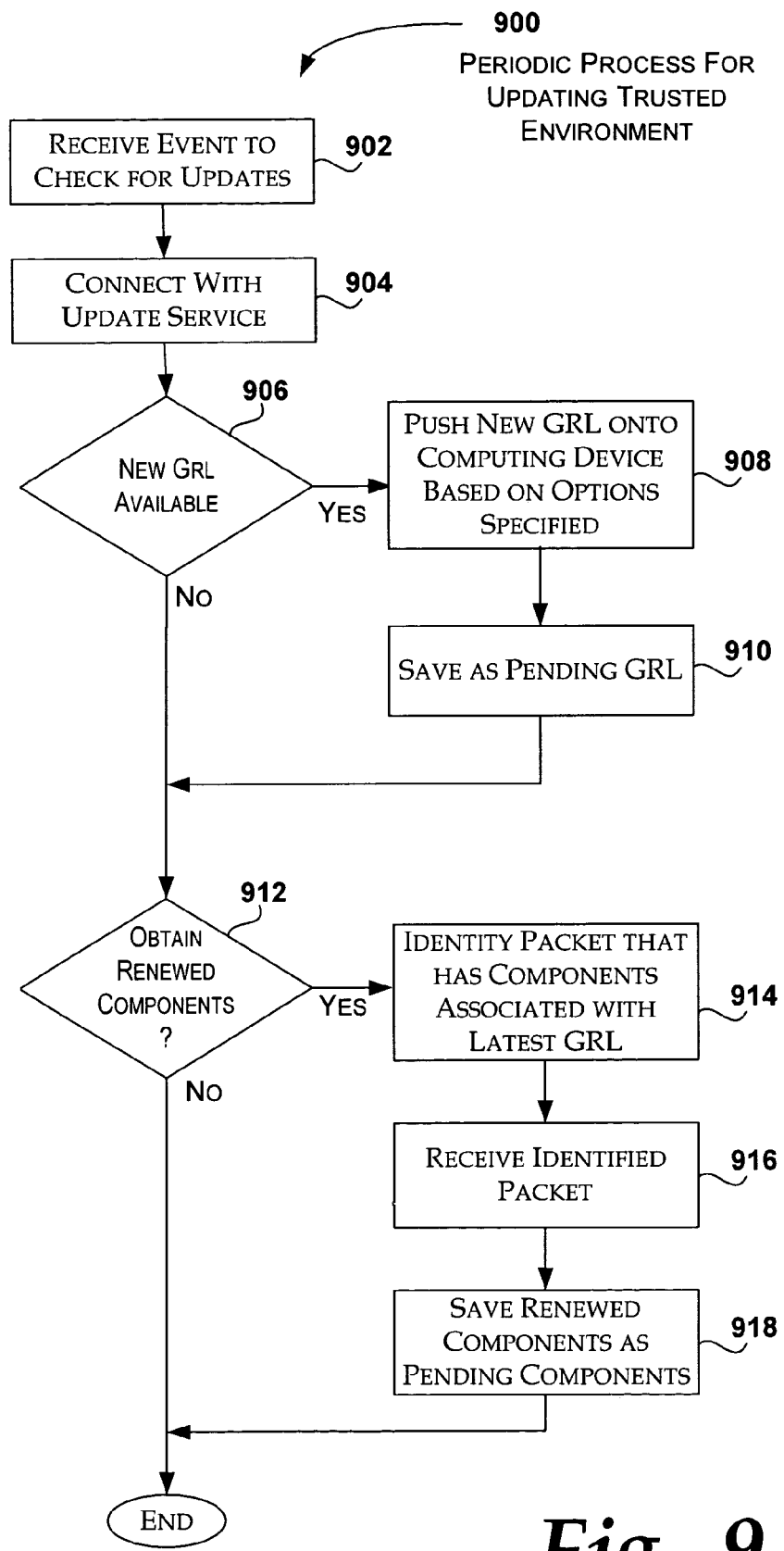
FIG. 9 is a flow diagram illustrating an exemplary process for performing a periodic process that updates the trusted environment on the computing device shown in FIG. 1.

FIG. 9 is a flow diagram illustrating an exemplary periodic process 900 for updating the trusted environment. In one embodiment, the periodic process 900 may utilize an existing software update mechanism, such as MICROSOFT® WINDOWS® Update software manufactured by MICROSOFT Corp. of Redmond, Wash. Process 900 begins at block 902, where a pre-determined event is received to signal that a check should be performed for updates to the trusted environment. The pre-determined event may be specified as a specific time, a specific action (e.g., at start-up), or the like. Prior to the pre-determined event, an option in a client service associated with the software update mechanism is configured for controlling the auto-update behavior for the periodic process. For example, the option may specify to 1) automatically download and install the newest global revocation list and all of the renewed components identified within the list; 2) download the newest global revocation list and identified renewed components but wait to install; 3) send a notification that a new global revocation list and/or renewed components are available for downloading but not to download or install them; or 4) turn off the periodic renewal. Other options may be added to the ones identified above. As explained above, renewal packages for renewed components are uploaded to a server that is configured to provide the software update mechanism. In general, the renewal packages for the periodic update are the same for the on-demand update. However, the two packages may differ in the case of the global revocation list. The periodic update package installs the new global revocation list to a temporary location, whereas the on-demand update package replaces the current global revocation list with the updated revocation list. Processing continues at block 904.

At block 904, a client service on the computing device connects to an update server configured to implement the software update service. Typically, this connection is made via the Internet. The client service and the update service communicate with each other in accordance with the option specified. Processing continues at decision block 906.

At decision block 906, the client service sends a request to the server to see whether the server has a new global revocation list available. In the embodiment using MICROSOFT® WINDOWS® Update software, the latest global revocation list may be published as a Recommended Update. If the latest global revocation list has been previously downloaded, processing continues at decision block 912. Otherwise, processing continues at block 908.

At block 908, based on the options specified, the client service performs the desired actions. For example, if option 4 (send notification) is selected, the client service sends a notification that is displayed on the computing device. The notification allows the end-user to specify whether to ignore the update, download and install, or just download. The download option entails copying the renewal package as file onto a storage device. The install option entails unpacking the renewal package into individual items (i.e., specified GRL, specified components). Typically, the client service is installed with a default option of 1 which is the less intrusive option to the end-user. Assuming, option 1 is selected, the latest global revocation list is pushed onto the computing device. The client service then invokes a trusted installer on the computing device to install the latest global revocation list. Processing continues at block 910.

At block 910, the latest global revocation list is saved as a pending global revocation list. Because it may be necessary to reboot the computing device when a new global revocation list is updated, the new global revocation list is saved without updating the computing device with the new global revocation list. The new global revocation list is not activated until the end-user attempts to process some protected content that requests a newer global revocation list than the current active global revocation list. The computing device may be set-up to have one pending global revocation list and one active global revocation list. With this set-up, the current pending global revocation is replaced with latest global revocation list that is pushed to the computing device. In another embodiment, the computing device may be set-up to maintain a pre-defined number of pending global revocation lists. With this set-up, the latest global revocation list that is pushed to the computing device is added as another pending global revocation list It is desirable to store the pending global revocation list(s) in a location on the computing device that has read and write access for all users of the computing device. This allows non-administrators the ability to update the global revocation list if needed. By saving the newly downloaded global revocation list as a pending revocation list instead of automatically updating the version of the global revocation list, a user will not have the unfortunate experience of being unable to process protected content that was previously processable. Therefore, the end-user does not have to be unnecessarily inconvenienced. Processing continues at decision block 912.

At decision block 912, a determination is made whether the renewed components should be downloaded. If the option is selected to not download the renewed component, processing is complete. Otherwise, processing continues at block 914.

At block 914, the client service sends a request for the latest packet with the renewed components associated with the latest global revocation list. Processing continues at block 916.

At block 916, the computing device receives the identified packet. Processing continues at block 918.

At block 918, the downloaded renewed components are saved as pending components in storage accessible by the computing device. PEAuth can then load these renewed computer-readable components when performing the on-demand process shown in FIG. 7 without needing to download the computer-readable components. Processing is then complete.

Figure 11:
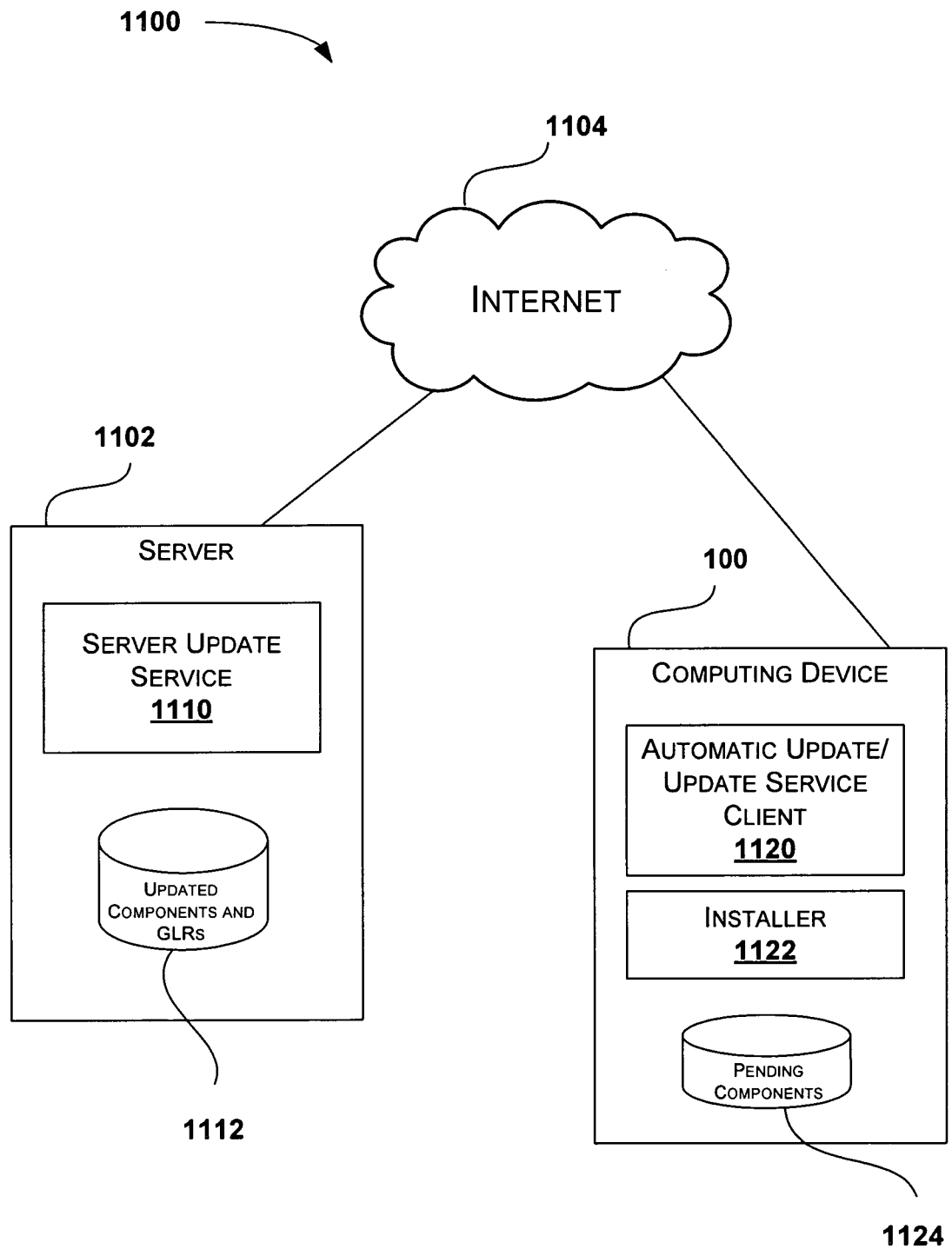
FIG. 11 is a block diagram of an exemplary architecture implementing the periodic process.

FIG. 11 is a block diagram of an exemplary architecture implementing the periodic process. The exemplary architecture includes a server 1102 and the computing device 100 connected via the Internet 1104. Server 1102 includes a server update service 1110 and storage 1112 for the updated versions of the revoked components and the newly published global revocation lists. Computing device 100 includes an automatic update service 1120 and an installer 1122. The automatic update service communicates with the server update service to obtain the identified components. The identified components are then installed on the computing device with installer 1122 as pending components 1124.

Figure 10:
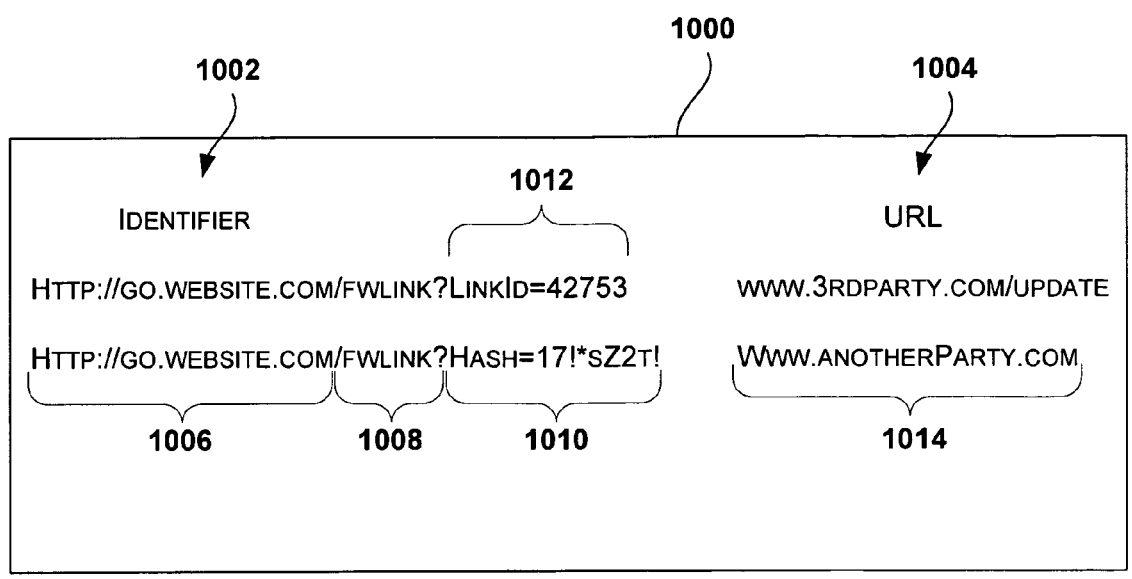
FIG. 10 is an exemplary mechanism for locating global revocation list updates and renewal components.

The processing performed in FIGS. 6-9 use the global revocation list described in FIG. 3. However, the processing may also be performed using other revocation list formats. For example, Digital Rights Media (DRM) applications utilize a Cardea style component revocation list and an App component revocation list. For these other formats, the present automatic update mechanism may incorporate a link mechanism. The link mechanism being configured to associate an identifier with a uniform resource locator (URL) where an updated component may be downloaded or a new revocation list may be downloaded. FIG. 10 illustrates one exemplary link mechanism for associating an identifier with a URL. In these other media applications, their look-up systems do not support the type of information needed by the present automatic update mechanism. Therefore, content enabler APIs are configured to receive any type of identifier and distinguish whether it is associated with a update service, a third party web site, or a help page. The media applications that utilize these other revocation lists include code that invokes the present automatic update mechanism. Then, instead of passing a GUID, the media application passes its own type of identifier, such as a hash or a public key. The media pipeline constructs a FWLINK using the identifier. The process then looks up the unique identifier via the link mechanism to get the associated URL. Table 1000 illustrates one embodiment for a link mechanism. Table 1000 includes two columns: an identifier column 1002 and a URL column 1004. In general, identifier uniquely identifies a component or revocation list. The identifier includes a website URL portion 1006 that supports a FWLINK mechanism 1008. The identifier also includes a link id 1012 or hash 1010 to associate with the unique component or revocation list. The URL column 1004 stores a URL for a website where the identified component may be install, help instructions can be obtain, and the like. If the URL includes GUID={someguid} as a query string parameter, the automatic update mechanism attempts to locate the component via the update service using the specified GUID. If the component is not located on the update service, the automatic update mechanism displays the URL to the end-user. The FWLINK database then ensures that URLs for components available via the update service are configured with a GUID as optional parameter. In one embodiment, a specific global revocation list may be specified using a query string parameter. The link mechanism is then populated so that the FWLINK points to a GUID that represents a setup package for specified version of the global revocation list using the second query string parameter. In operation, when the content enabler object is initialized with the global revocation list hash (i.e., a fixed string), the version of the global revocation list is specified using query string parameters. When content enabler performs the FWLINK operation, it detects the link specifies a GUID. Then, the content enabler downloads and installs the component with that GUID using the update service.

While example embodiments and applications have been illustrated and described, it is to be understood that the invention is not limited to the precise configuration and resources described above. Various modifications, changes, and variations apparent to those skilled in the art may be made in the arrangement, operation, and details of the disclosed embodiments herein without departing from the scope of the claimed invention.

What is claimed is:

1. A computer-readable storage medium having computer-executable instructions performing a method, comprising:
    determining whether computer-readable components loaded within a memory of a computing device are at a level of protection specified for protected content that a media application is attempting to process; and
    if a current level of protection of the computing device provides less protection than the level of protection specified for the protected content, updating a file to achieve at least the level of protection specified by the protected content, wherein updating is performed in a manner that minimizes rebooting of the computing device.

2. The computer-readable storage medium of claim 1, wherein updating the file includes accessing an update service where the file as been published.

3. The computer-readable storage medium of claim 2, wherein the update service includes MICROSOFT® WINDOWS® update software.

4. The computer-readable storage medium of claim 2, further comprising obtaining an updated version of each component listed as a revoked component within the file and needed for processing of the protected content.

5. The computer-readable storage medium of claim 4, wherein the updated version of the component is available on the computing device as a pending component that was previously downloaded.

6. The computer-readable storage medium of claim 4, wherein the file is in a format for a Cardea-style certification revocation list (CRL) and the revoked component is identified with a certificate hash, the certificate hash being used to identify a location on the update service from where to download the updated version, or if not available on the update service, identifying a uniform resource locator.

7. The computer-readable storage medium of claim 6, wherein the URL navigates to a help page.

8. The computer-readable storage medium of claim 6, wherein the URL navigates to a third party website where the updated version can be downloaded.

9. The computer-readable storage medium of claim 6, wherein a FWLINK mechanism is used to identify the location or the uniform resource locator.

10. The computer-readable storage medium of claim 4, wherein the file is in a format for an App certification revocation list (CRL) and the revoked component is identified with a public key, the public key being used to identify a location on the update service from where to download the updated version, or if not available on the update service, identifying a uniform resource locator.

11. The computer-readable storage medium of claim 4, wherein the file is in a format for a global revocation list and the revoked component is identified by a GUID, the GUID being used to identify a location on the update service from where to install the update version.

12. The computer-readable storage medium of claim 4, further comprising loading the updated version of each component within the memory before performing the rebooting, if the rebooting is necessary.

13. The computer-readable storage medium of claim 1, wherein minimizing rebooting of the computing device is based on a reboot parameter within the file and not rebooting unless the reboot parameter indicates the file contains at least one malicious kernel-mode computer-readable component.

14. The computer-readable storage medium of claim 13, wherein minimizing rebooting is further based on a process restart parameter within the file and restarting each process associated with the processing of the protected content if the process restart parameter indicates that the file contains at least one malicious user-mode computer-readable component.

15. The computer-readable storage medium of claim 14, wherein the process restart parameter is configured as a counter that increments if the file identifies a malicious user-mode computer-readable component and remains the same if there is not a malicious user-mode computer-readable component identified in the file.

16. A computing device, comprising:
a processor;
a memory into which a plurality of computer-executable components are loaded, the plurality of components comprising:
a media application for processing protected content;
an authorization component executing within a kernel space of the memory;
a renewal component configured to receive an identifier associated with one of the plurality of computer-executable components when the authorization component fails to load the one component due to its untrustworthiness and to automatically obtain an updated version of the one component using the identifier upon user authorization.

17. The computing device recited in claim 16, wherein the identifier comprises a hash of a binary file containing the revoked component.

18. The computing device recited in claim 16, wherein the identifier comprises a certificate that has signed the revoked component.

19. The computing device recited in claim 16, wherein automatically obtaining the updated version comprises sending the identifier to an update service, the identifier specifying a location on the update service from where to download the updated version.

20. A computer-readable storage medium having stored thereon a data structure, comprising:
a header section including a version identifier and a force reboot parameter, the version identifier corresponding to a level of trust provided to protected content processed by a computing device enforcing the data structure;
a revocation section identifying at least one computer-readable component that has become untrustworthy in supporting the level of trust; and
a renewal section identifying a location for an updated version of a corresponding computer-readable component identified within the revocation section; wherein upon processing of protected content, the version is examined to determine whether the computing device needs to obtain another data structure having a different version and examining the force reboot parameter to determine whether the computing device needs to be rebooted after obtaining the updated version for each of the computer-readable components, the force reboot parameter indicating that rebooting occurs if any one of the computer-readable components identified in the revocation section is a malicious kernel-mode computer-readable component.

* * * * *